May 14, 1957 F. L. RICH 2,792,339
ROTARY SLUDGE COKER WEARING RING
Filed Dec. 31, 1952 2 Sheets-Sheet 1

INVENTOR.
Francis L. Rich
BY
Everest A. Johnson
ATTORNEY

INVENTOR.
Francis L. Rich
BY Everett A. Johnson
ATTORNEY

United States Patent Office 2,792,339
Patented May 14, 1957

2,792,339

ROTARY SLUDGE COKER WEARING RING

Francis L. Rich, Hammond, Ind., assignor to Standard Oil Company, Chicago, Ill., a corporation of Indiana Application December 31, 1952, Serial No. 329,072

3 Claims. (Cl. 202—131)

This invention relates to apparatus such as rotary kilns and the like for use in material handling and treating processes and more particularly in the coking of acid sludge.

The present invention is concerned with a rotary heating drum of the type wherein one end of which the raw material is fed and from the other the finished product may be continuously extracted, at the same time effecting a separation between gaseous and solid products.

Briefly, my invention comprises an improved wearing ring for a rotary kiln, e. g. a sludge coker. The process to which this apparatus is particularly adaptable is for the recovery of sulfur values from acid sludge of the type obtained from sulfuric acid treatment of hydrocarbon oils. Such acid sludges contain relatively large quantities of free sulfuric acid or sulfuric acid derivatives of hydrocarbons and the disposal and/or treatment of the many types of acid sludges present many problems. However, it has been found that by contacting a highly heated fluent mass of finely divided coke with acid sludge in a rotating drum, the introduced sludge is decomposed by direct contact with the hot solids. The weight ratio of hot coke solids to acid sludge introduced into the coking zone is maintained sufficient to supply the required amount of heat to effect decomposition of the acid sludge at the optimum coking temperature level.

The improvement comprises a separable, annular wearing ring or rings disposed between a rotary cylinder and a fixed header. The wearing ring functions as a sealing means between the rotating kiln and the stationary gas header and heretofore the wearing ring constituted an integral portion of the end plate of the sludge coker. Accordingly, it was conventionally necessary to replace a huge plate section, of which the wearing ring is an integral part, covering a substantial portion of the discharge end of the sludge coker kilns. These wearing rings must be replaced frequently at a high cost and long shutdowns.

It is, therefore, a primary object of my invention to provide a wearing ring assembly for use on rotary kilns that may be readily installed and which provides a proper seal between the rotating kiln and the fixed gas header. Another object of my invention is to provide a means for replacing wearing ring seals without the necessity for a major shutdown of the apparatus. A further object is to provide a wearing ring assembly which is adjustable for take-up of wear. These and other objects of my invention will become apparent as the detailed description thereof proceeds.

A preferred embodiment of my invention is illustrated by way of example in the accompanying drawings wherein.

Figure 1:
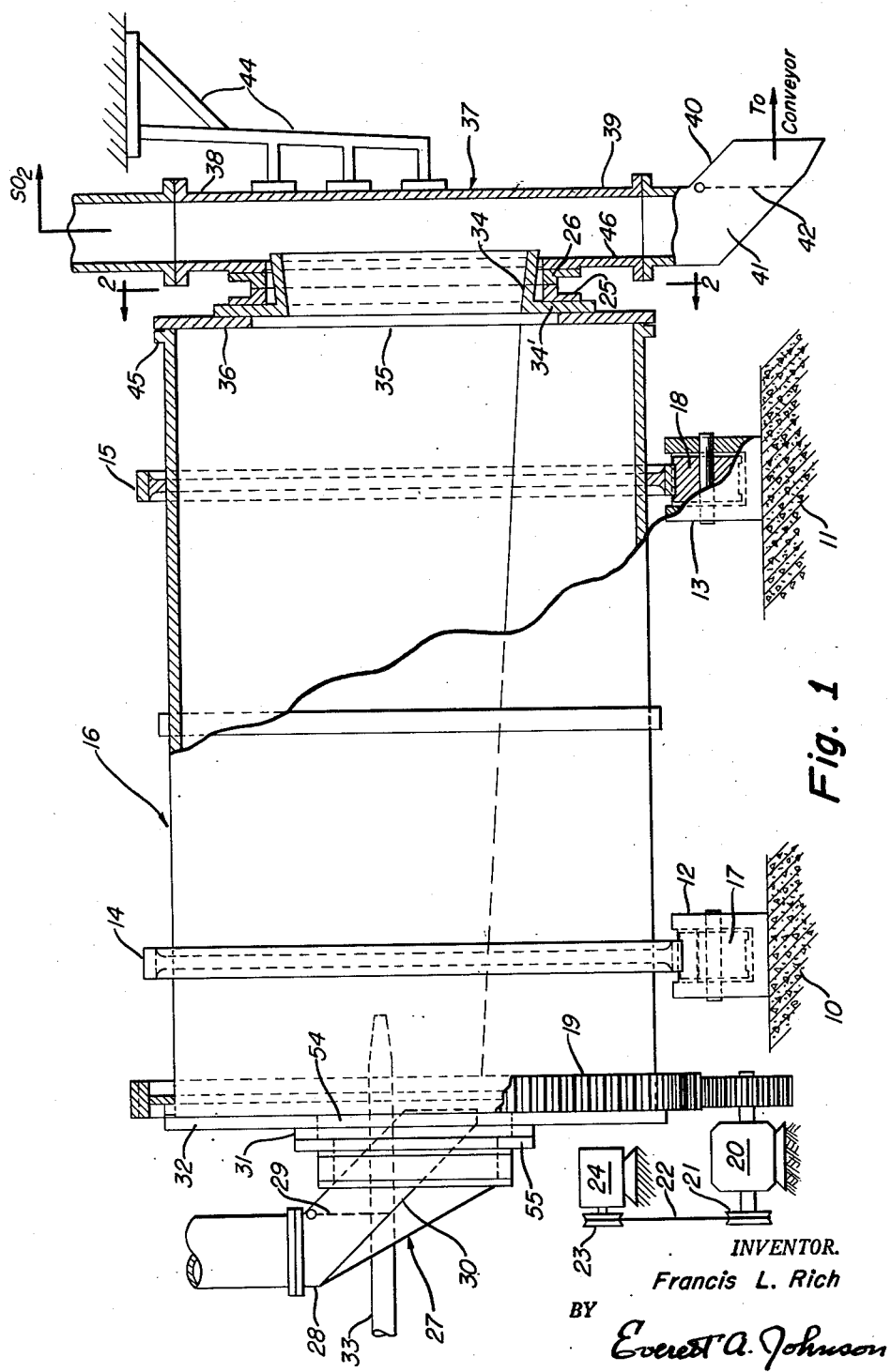
Figure 1 is a side elevation partly in section of the improved apparatus as set up for coking of acid sludge.
Figure 2:
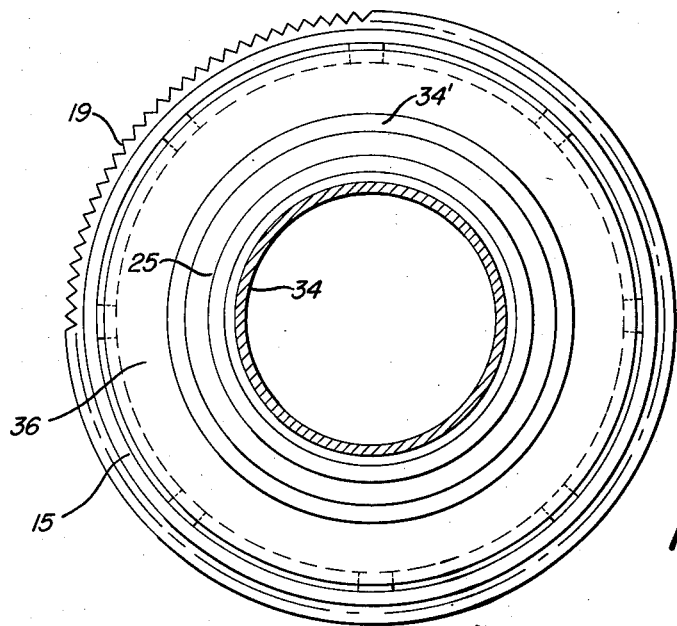
Figure 2 is a section taken along the line 2—2 in Figure 1.

Throughout the drawings, fastening means such as rivets, bolts and welds have been omitted for clarity. However, it is to be understood that the various parts are secured to each other when necessary and desirable by conventional and suitable means.

The improved rotary kiln is supported on suitable foundations 10 and 11 which may be made of concrete or the like, these foundations supporting the base members 12 and 13. The tires or riding rings 14 and 15, spaced upon and secured to the rotary tubular kiln vessel 16, are adapted to rest on flanged supporting rollers 17 and 18 carried by base members 12 and 13 wherein an oil level is maintained above the axis of the supporting rollers or bearings whereby the tires 14 and 15 are continuously lubricated. A rotatable gear ring 19 is secured to the kiln as illustrated and may be driven through a gear box 20, pulley 21, belt 22, drive pulley 23, and motor 24. However, if desired, a direct gear drive may be used between a motor 24 and the gear box 20.

In the drawing the rotary kiln 16 is illustrated as mounted horizontally, but for some installations it may be desirable to incline the tubular vessel 16. In such an installation the problem of wear is increased and the need for ready and simple replacement of the wearing rings 25 and 26 is even more important.

Hot coke is introduced into the inlet end of the kiln 16 through a stationary coke inlet header 27. This header 27 includes a hopper 28, a flap valve 29 and a chute 30. The header terminates in a circular outlet which is provided with a wearing ring for contact with the corresponding inlet wearing ring 31 in the inlet plate 32 forming one end of the rotary kiln 16. Sludge to be coked is introduced by a pump means (not shown) which may be a gear pump, discharging from sludge inlet line 33 into the interior of the kiln 16 where it is contacted with hot coke introduced from chute 30. Within the kiln 16 the coked and coking sludge forms an inclined mass extending from below the inlet chute 30 to the wider and lower outlet collar 34. The rotation of the kiln during the introduction of the hot coke which supplies heat, and the acid sludge which is to be coked insures contact of the material and also insures that the coking mass will gradually gravitate to the lower end thereof to be discharged therefrom.

The opposite or discharging end 35 of the drum 16 terminates in a drum plate 36 and the discharge collar 34 fixed to the plate 36. The collar is of such axial length as to extend within a fixed discharge header 37 having an upper gas outlet 38 and a lower coke discharge outlet 39 which communicates with a coke chute 40. The coke chute 40 includes a hopper 41, a flap valve 42 and a chute 40 which discharges to a conveyor (not shown). Part of the coke recovered is recycled to a coke heating kiln which supplies hot coke to the inlet hopper 28 and part of the coke is removed from the system as part of the product.

The product take-off header 37 is stationary, but is supported from above by braces 44. These braces are so constructed and arranged as to apply a steady pressure between the kiln wearing ring 25 and the corresponding header wearing rings 26. The sulfur dioxide rich gases withdrawn from the gas outlet 38 are supplied to a suitable recovery means (not shown).

Within the rotating kiln 16 I may provide a freely rotating cylindrically shaped tumbler (not shown) made of spaced iron rails. This tumbler breaks up the large pieces of coke and maintains the coking mass fluent so that it will provide a continuous coking process. In addition, a fixed scraper (not shown) may be used inside the kiln to scrape the coke and sludge from the top and sides of the kiln.

Referring to Figures 2, 3, 4, and 5 I have illustrated in more detail the structure of the wearing rings 25 and 26.

The kiln and plate 36 comprises an annular member which is secured as by bolting to the end flange 45 of the drum 16. The discharge collar 34, which is flared outwardly, has a contiguous annular portion 34' which is fixed about the interior periphery of the annular drum plate 36. The product take-off header 37 has a corresponding annular header plate 46 which is adapted to support one of the complementary wearing ring assemblies 26.

Figure 3:
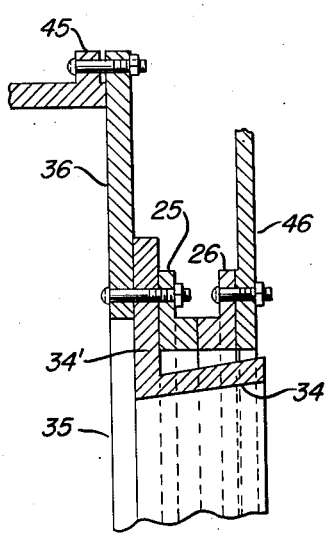
Figures 3, 4 and 5 are enlarged fragmentary sections of embodiments of the wearing ring seal.
Figure 4:
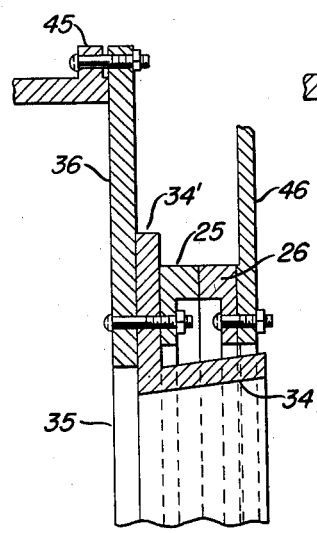
Figure 5:
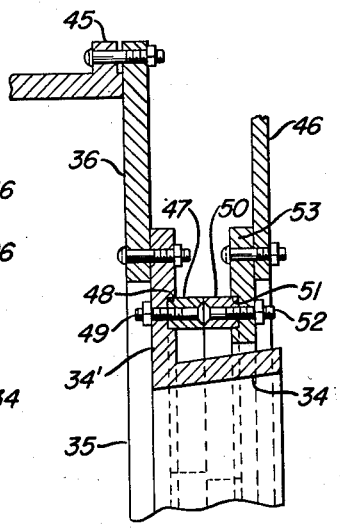

The wearing ring assemblies may comprise flanged wearing rings 25 and 26, as shown in Figures 1 to 4 which rings may be bolted to the flange 34' and header plate 46 respectively as shown in Figures 3 and 4. Alternatively the wearing ring assemblies may comprise segmented insert wearing rings as illustrated by Figure 5. Thus insert wearing ring 47 may be held in annular recess 48 in flange 34' by countersunk bolt 49 to bear against insert wearing ring 50 which is held in annular recess 51 by countersunk bolt 52, annular recess 51 being formed in an annular supporting plate 53 which is bolted to header plate 46. Bolts 49 and 52 should be made of soft material than segmented wearing rings 47 and 50. Cast iron has been found to be suitable material for wearing rings although steel or alloy might be used. One method of making a wearing ring is to weld the steel wearing surface to an annular piece of steel boiler plate which serves as the flange to bolt the wearing ring assembly to outlet collar 34' or annular header 46. The rings 25 and 26 (or 47 and 50) may comprise segments which, when assembled in place, form the annular ring.

The coke and sludge inlet 27 on the inlet closure plate 32 comprise a circular opening 54 on the center line of the drum 16. Wearing shoulder 31 extends axially of the drum 16 and contacts a wearing ring 55 carried by the outlet flange of the chute assembly 27. However, the actual inlet chute 30 is of substantially smaller cross section than the inlet opening 54 and comprises an inclined conduit discharging below the center line of the drum 16. The acid sludge introduced by conduit 33 is at a level above the center line of the drum 16 with the result that the sludge is sprayed over the moving particles of hot coke in the tumbling bed.

In a typical operation the finely divided coke particles are introduced into the drum at a temperature of between about 950° and about 1200° F. The acid sludge in introduced, preferably as a spray, and brought into intimate contact with the highly heated fluent mas of hot coke particles within the drum 16. A rapid decomposition takes place to produce gaseous sulfur dioxide, water, hydrocarbons and coke. In general, the coke to sludge weight ratio is between about 2 and 5, for example, 3 or 4 to 1. The very large surface presented by the tumbling mass of the finely divided coke particles permits the acid sludge to be coked at a high rate. The optimum coking temperature within the coking drum 16 will ordinarily be between about 400° and 1000° F., preferably about 450° to 750° F.

Gasiform products are separated from coke particles and sent to sulfur dioxide recovery equipment well known in the art. This frequently comprises an absorber and stripper system. Finely divided sludge coke including new and recycled sludge coke is continuously withdrawn from the coking system. A portion of the withdrawn coke may be burned by contacting with an oxygen containing gas to produce a highly heated residual portion of coke. The finely divided hot coke is withdrawn from the heating zone and transferred to the hot coke chute.

The net production of coke is ordinarily withdrawn from the product take-off header, but may be recovered as an aliquot portion of the heated coke from the coke heating stage.

In view of the above, it will be apparent that I have attained the objects of my invention and have provided an improved apparatus wherein wearing rings under severe operating conditions may be readily replaced without replacing the entire wearing ring plate and without necessitating prolonged shutdowns of valuable operating equipment.

Although my invention has been described with reference to preferred embodiments thereof, it is to be understood that these are by way of example only and that it is contemplated that modifications and alternative embodiments may be devised by those skilled in the art without departing from the scope and spirit of my invention.

What I claim is:

1. A process apparatus including a tubular shell, means for rotatably supporting said shell in a generally horizontal but inclined position, a fixed hopper inlet means discharging into the upper end of said inclined shell, an annular drum plate fixed to the lower end of said shell, a product take-off header means disposed at the lower end of said shell, said header having a port of smaller flow area than the cross section of said shell, depending cantilever beam means supporting said header means adjacent said drum plate, outwardly flared discharge collar extending within said header and having a flange fixed to said drum plate, a first sealing and wear ring fixed to the flange on said collar, a second sealing and wear ring supported by said header about said port and in register with said first ring, a lower solids discharging chute extending downwardly from said header, and an upper conduit means connected to said header above the said port therein.

2. The apparatus of claim 1 wherein the said first ring comprises an annular member countersunk within the collar flange, an annular support plate is fixed about the port in said header, and the said second ring comprises an annular member countersunk in the said annular support plate.

3. The apparatus of claim 1 wherein the cantilever beam means yieldably urges said header means axially of said shell and of said discharge collar whereby said discharge collar means extends within said header and whereby said first and second rings are held in sealing relationship as the said shell is rotated relative to said header.

References Cited in the file of this patent

UNITED STATES PATENTS

| | | |
|---|---|---|
| Re. 21,357 | Bartholomew | Feb. 20, 1940 |
| 1,245,634 | Sutcliffe | Nov. 6, 1917 |
| 1,401,136 | Chappell | Dec. 27, 1921 |
| 1,413,779 | Randall | Apr. 25, 1922 |
| 1,638,992 | Gillett | Aug. 16, 1927 |
| 1,703,419 | Dwyer | Feb. 26, 1929 |
| 1,930,756 | Heath et al. | Oct. 17, 1933 |
| 1,982,523 | Komarek | Nov. 27, 1934 |
| 2,097,271 | Debuch et al. | Oct. 26, 1937 |
| 2,461,754 | Mertz | Feb. 15, 1949 |
| 2,500,295 | Peirce | Mar. 14, 1950 |
| 2,587,639 | Miley | Mar. 4, 1952 |